March 1, 1966    E. D. HOBBS ETAL    3,238,439
ALTERNATOR VOLTAGE REGULATOR
Filed May 28, 1962    2 Sheets-Sheet 1
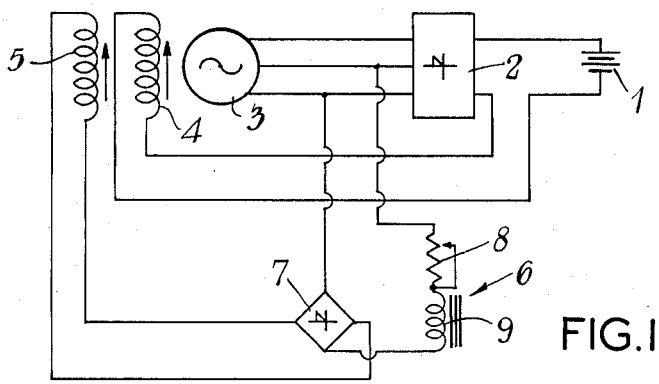
FIG.1
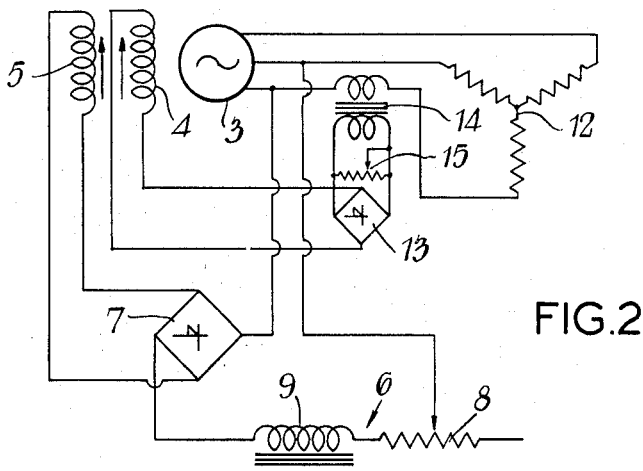
FIG.2
FIG.3
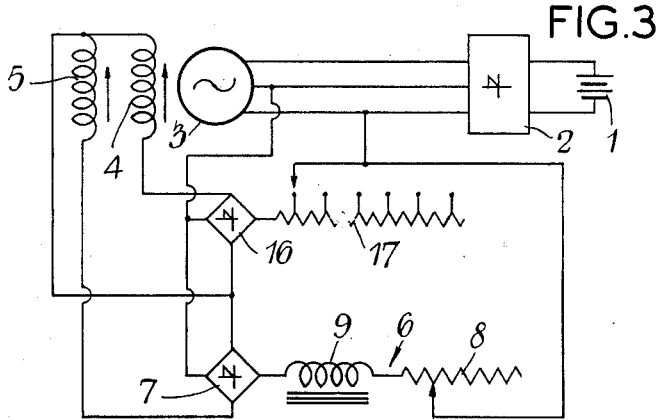
Inventors
Edwin Daniel Hobbs,
Peter John Cole
by Sommers & Young
Attorneys March 1, 1966  E. D. HOBBS ETAL  3,238,439
ALTERNATOR VOLTAGE REGULATOR
Filed May 28, 1962  2 Sheets-Sheet 2

United States Patent Office 3,238,439
Patented Mar. 1, 1966

3,238,439
ALTERNATOR VOLTAGE REGULATOR
Edwin Daniel Hobbs, Chislehurst, Kent, and Peter John Cole, Sidcup, Kent, England, assignors to J. Stone & Company (Deptford) Limited, London, England
Filed May 28, 1962, Ser. No. 198,003
Claims priority, application Great Britain, July 18, 1961, 26,047/61
8 Claims. (Cl. 322—63)

This invention concerns improvements relating to electrical supply systems of the kind comprising an alternator which is driven at varying speed, particularly but not necessarily a supply system for a railway vehicle comprising an axle-driven alternator.

In accordance with the invention, an electrical supply system comprises an alternator to be driven at variable speed with a substantially fixed excitation and under conditions of loading approaching short-circuit conditions, i.e. under conditions such that the reactive drop in the alternator exceeds the voltage across the external circuit the said alternator being provided not only with a field winding supplied to give a constant excitation, but also with an auxiliary, additive, field winding fed through a frequency-sensitive circuit designed so that the auxiliary excitation has little effect at high-alternator speeds, but an appreciable additive effect at low speed. Generally, use will be made of a high-frequency unsaturated machine.

The current supplied by such an alternator will remain substantially constant over a wide range of alternator speeds, i.e. even down to a low full-load speed. The effect at low speed may be enhanced by so designing a choke in the frequency-sensitive circuit that it will saturate at the higher field current associated with low-speed, low-frequency, operation.

If the load includes a battery supplied through a rectifier, the main field winding may be fed with the output current from the said rectifier, while the auxiliary winding is shunt supplied through a separate rectifier connected between the frequency-sensitive circuit and the latter winding.

Alternatively, the main field winding may have applied to it a voltage proportional to the output current and obtained by rectifying the output of a current transformer connected in the output circuit of the alternator.

Figure 4:
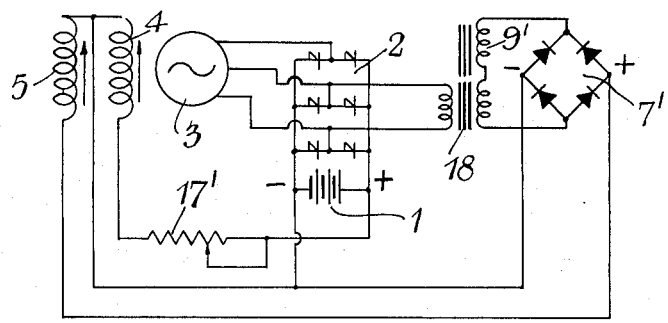
Figure 5:
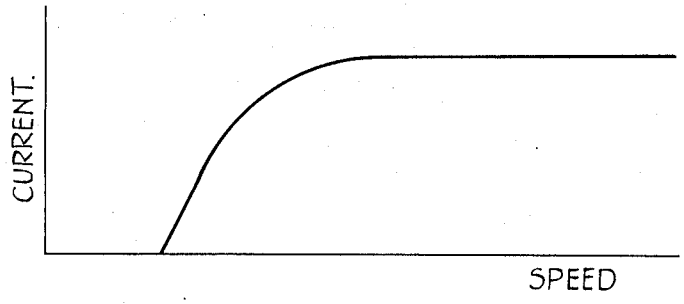
Figure 6:
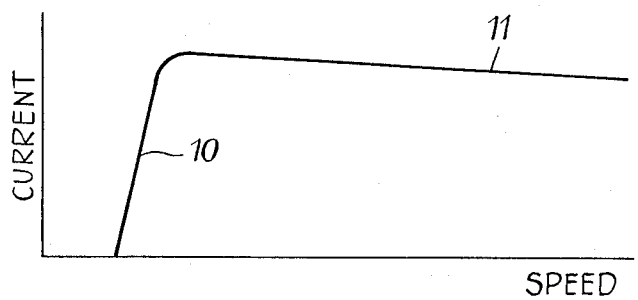

Examples of arrangements for carrying the invention into effect will now be more fully described with reference to the accompanying drawings, in which:

FIGURES 1 to 4 are circuit diagrams, each illustrating a suitable arrangement, and FIGURES 5 and 6 are current speed diagrams, illustrating how the current behaviour differs from that obtained by a known arrangement.

In FIGURE 1, the load, represented by a battery 1, is supplied through a main rectifier 2 from a three-phase alternator 3 which is driven at variable speed, for example from the axle of a railway vehicle. The alternator may be a single or polyphase machine and may be of any suitable type, for example an inductor or rotating-field machine. The main field winding 4 of the alternator is supplied with the output current from the rectifier 2. An auxiliary shunt field winding 5, whose effect is additive in relation to that of the winding 4, is supplied from one of the phases of the alternator output through a frequency-sensitive circuit 6 and a separate auxiliary rectifier 7. As illustrated, the said circuit consists simply of an adjustable resistor 8 and a choke 9 in series.

The alternator 3 is suitably an unsaturated high-frequency machine operating over a frequency range from, say 25 to 1,000 or 25 to 10,000 cycles per second. It is designed to be operated under conditions approaching short-circuit conditions, that is so that the reactive drop in the alternator exceeds the voltage across the external circuit. Under these conditions, the current supplied by the alternator 3 will tend to remain substantially constant over a wide range of speeds and the field winding 4 will afford a substantially fixed excitation.

The frequency-sensitive circuit 6 is designed, with the field winding 5, in such a manner that the additive excitation by the latter has little effect at high alternator speeds and, therefore, high frequencies, but an appreciable effect at low speed and frequency. This effect at low speed may be enhanced by so designing the choke 9 that it will saturate at the higher field current obtained at low frequency. The effect of the additive field is to give an earlier and more rapid rise to the full-load current of the alternator as the speed of the latter commences to increase from a low value, but without interfering with the maintenance of the output current substantially constant over the full range.

This may be better appreciated from a comparison of FIGURE 6, illustrating the relation of output current to speed for an arrangement such as has been described, with FIGURE 5, illustrating the relation obtained with a conventional known arrangement. In FIGURE 6, it will be seen that the current value rises comparatively sharply (10) and then remains substantially constant (11), declining slightly with increasing speed.

The load may not require a battery and, if it is an A.C. load, the main rectifier 2 may be dispensed with. In the arrangement of FIGURE 2, in which the load is represented as a three-phase alternating current load 12, for example comprising vehicle heaters, the main field winding 4 has applied to it a voltage proportional to the output current and obtained by way of a rectifier 13 from a current transformer 14 connected in the output circuit of the alternator, e.g. in one phase thereof in the case of the polyphase alternator shown. An adjustable loading resistor 15 is connected across the secondary of the transformer 14 in known manner. Essentially, the arrangement of FIGURE 2 will operate in the same manner as that of FIGURE 1.

If it is desired to be able to set the output of the alternator 3 to a number of current levels, this can be achieved by changing the resistance value of a diverter across the circuit for the main field winding 4. The change in resistance may be a stepwise change.

If the constant main field winding 4 is a shunt winding supplied through the main rectifier 2 or, as shown in FIGURE 3, through a separate auxiliary rectifier 16, the output level may be varied by changing the value of resistance 17 in series with the said winding.

In the arrangement of FIGURE 4, the two field windings 4 and 5 have a common internal connection. In this case, it is necessary to insert a transformer 18 in the supply to one winding, as shown the supply to the auxiliary winding 5 by way of the auxiliary rectifier 7'. An adjustable resistor 17', serving the function of the resistor 17 in FIGURE 3 is provided on the D.C. side of the rectifier 2. The frequency-sensitive element in this instance comprises a choke 9' only.

If required, the system may be arranged to be protected by an over-current relay and/or an over-voltage relay in per se known manner. A contactor switch may be provided for connecting the load to the alternator.

We claim:

1. An electrical supply system comprising a variable-speed, high-frequency, unsaturated alternator, a load connected to said alternator, said load having an impedance of the same order as the internal impedance of said alternator, said alternator being provided with a field winding, means for supplying the said winding with a substantially constant current, said alternator also being provided with an auxiliary, additive, field winding, a frequency-sensitive circuit having a low impedance at low alternator speed, when the frequency is low, and a high impedance at high speed, when the frequency is high, and connections connecting said frequency-sensitive circuit and said auxiliary field winding, whereby the said auxiliary winding will give an appreciable increase in excitation.

2. A system as claimed in claim 1, and comprising rectifying means connected with said alternator, and a current transformer having its primary winding connected in the output circuit of said alternator and its secondary winding connected to the main field winding, whereby the said windings together have applied to them a voltage proportional to the output current of the alternator.

3. A system as claimed in claim 1, wherein the frequency-sensitive circuit comprises a choke connected in series with an adjustable resistor.

4. A system as claimed in claim 1, wherein an adjustable diverter is connected across the circuit of the main field winding.

5. A system as claimed in claim 1, wherein an adjustable resistance is connected in series with the main field winding.

6. A system as claimed in claim 1, wherein the frequency-sensitive circuit comprises a saturable choke.

7. A system as claimed in claim 1, comprising rectifying means and a current transformer having its primary winding connected in the output circuit of the alternator and its secondary winding connected to the main field winding, whereby the said winding has applied to it a voltage proportional to the output current of the alternator.

8. A system as claimed in claim 1, wherein one of said field windings is connected to the alternator by way of a transformer.

References Cited by the Examiner
UNITED STATES PATENTS

| | | | |
|---|---|---|---|
| 2,363,856 | 11/1944 | Fisher | 322—63 |
| 2,363,857 | 11/1944 | Crever et al. | 322—32 |
| 2,719,259 | 9/1955 | Miner | 322—25 |
| 2,754,469 | 7/1956 | Finhenauer et al. | 322—63 |

LLOYD McCOLLUM, *Primary Examiner.*